United States Patent
Hallman

(10) Patent No.: US 6,896,718 B2
(45) Date of Patent: May 24, 2005

(54) GAS DEHYDRATION WITH CAVITATION REGENERATION OF POTASSIUM FORMATE DEHYDRATING SOLUTION

(75) Inventor: John H. Hallman, New Waverly, TX (US)

(73) Assignee: Clearwater International LLC, Houston, TX (US)

( * ) Notice: Subject to any disclaimer, the term of this patent is extended or adjusted under 35 U.S.C. 154(b) by 730 days.

(21) Appl. No.: 09/938,935

(22) Filed: Aug. 24, 2001

(65) Prior Publication Data

US 2002/0056828 A1 May 16, 2002

Related U.S. Application Data

(60) Provisional application No. 60/231,768, filed on Sep. 12, 2000.

(51) Int. Cl.[7] ............................................. B01D 53/14
(52) U.S. Cl. .......................... 95/231; 95/220; 95/239; 95/156; 95/180; 95/188; 95/193
(58) Field of Search .................... 95/231, 220, 239, 95/156, 180, 188, 193

(56) References Cited

U.S. PATENT DOCUMENTS

| | | |
|---|---|---|
| 2,143,008 A | 5/1939 | Heath et al. |
| 2,233,185 A | 2/1941 | Smith |
| 3,687,614 A | 8/1972 | Yavorsky et al. |
| 4,487,027 A | 12/1984 | Macriss et al. |
| 4,804,522 A | 2/1989 | Hass |
| 5,104,562 A | 4/1992 | Kardos et al. |
| 5,183,513 A | 2/1993 | Sajewski |
| 5,184,576 A | 2/1993 | Sajewski |
| 5,188,090 A | 2/1993 | Griggs |
| 5,239,948 A | 8/1993 | Sajewski |
| 5,385,298 A | 1/1995 | Griggs |
| 5,725,637 A | 3/1998 | Gavlin et al. |
| 5,846,450 A | 12/1998 | Atkinson |
| 5,922,109 A | 7/1999 | Rooney et al. |
| 5,957,122 A | 9/1999 | Griggs |
| 6,059,996 A | 5/2000 | Minks et al. |
| 6,221,276 B1 | 4/2001 | Sarin |
| 6,514,321 B1 * | 2/2003 | Lehto et al. ................... 95/180 |
| 6,666,906 B2 * | 12/2003 | Hallman ......................... 95/52 |

* cited by examiner

*Primary Examiner*—Charles Boyer
*Assistant Examiner*—Derrick G. Hamlin
(74) *Attorney, Agent, or Firm*—Moser, Patterso & Sheridan, L.L.P.

(57) ABSTRACT

Moisture is removed from gas by contacting the gas with a solution of potassium formate to remove moisture from the gas, regenerating the potassium formate solution by removing water from it, and returning the potassium formate solution to contact gas to dehydrate it. Regeneration of the potassium formate solution is most preferably accomplished in a cavitation regenerator. The gas is most preferably natural gas.

20 Claims, 5 Drawing Sheets

GAS DEHYDRATION WITH CAVITATION REGENERATION OF POTASSIUM FORMATE DEHYDRATING SOLUTION

RELATED APPLICATION

This application claims the benefit of Provisional Application 60/231,768 filed Sep. 12, 2000, entitled "Gas Dehydration with Evaporative Regeneration of Dehydrating Solution"

TECHNICAL FIELD

This invention relates to the use of solutions of potassium formate to dehydrate gas and to the use of a cavitation pump to regenerate water absorbing liquids. The invention may be used to dry air and is particularly useful for natural gas transmission lines. After absorbing water from the gas, the solution is regenerated by a cavitation regenerator such as a shock wave pump.

BACKGROUND OF THE INVENTION

Glycols, especially triethylene glycol, are commonly used to absorb moisture from natural gas. After absorbing water by contacting the gas, the glycol solutions are usually regenerated by heating them to evaporate the water; the glycol solution, restored to its original strength, is then returned to the water absorption unit to absorb more moisture in a more or less continuous process.

Inevitably, the environment is exposed to the glycol solutions used in gas dehydration. Glycols are generally environmentally undesirable. An article at pages 59–79 of Chapter 6, Section 2 of the Engineering Data Books of the Gas Producers Society of America, entitled "Glycol Dehydration", describes a typical gas drying and solution regeneration system, and some of the problems that can arise with such systems. Such a prior art gas drying and glycol regeneration system is shown in FIG. 1 hereof in a simplified form.

Atkinson, in U.S. Pat. No. 5,846,450, suggests the use of a potassium formate solution as a vapor absorbent in refrigeration, air conditioning, and dehumidifying systems. Potassium formate is an environmentally acceptable gas drying medium, but a more convenient and efficient method of regenerating solutions of potassium formate and other liquid absorbents would be highly beneficial for its commercial use.

SUMMARY OF THE INVENTION

This invention uses potassium formate solutions to dehydrate natural gas, and regenerates the solutions by passing them through a cavitation pump, which generates shock waves to heat the solution. Preferably the pump is one manufactured and sold by Hydro Dynamics, Inc., of Rome, Ga., most preferably the "Hydrosonic Pump" described in the Hydro Dynamics Inc. website dated Jun. 21, 2000 and in U.S. Pat, Nos. 5,183,513, 5,184,576, 5,239,948, 5,385,298, 5,957,122 and particularly 5,188,090, all of which are incorporated herein by reference in their entireties. As indicated below, cavitation pumps are referred to herein as cavitation regenerators, and in one aspect of my invention cavitation regenerators are used to regenerate glycol and other liquid absorbents.

Figure 4:
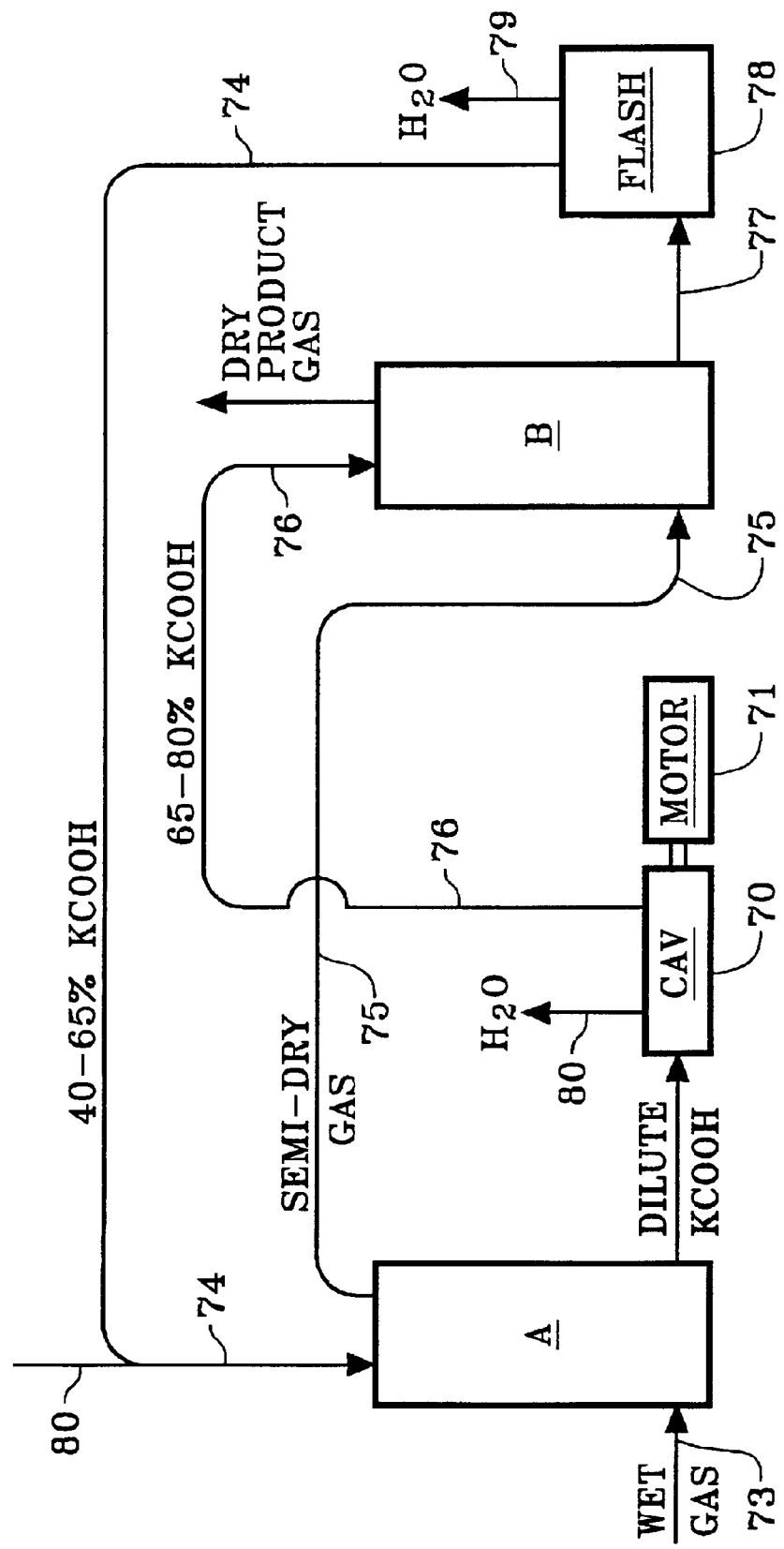

A different two-stage gas drying configuration is shown in FIG. 4.

DETAILED DESCRIPTION OF THE INVENTION

This invention utilizes aqueous solutions of potassium formate, which is environmentally benign, to absorb water from natural gas. The potassium formate may be used in concentrations of from 40% to 80%, preferably from 65% to 77%, and most preferably from 70% to 75%. In a preferred mode, my invention utilizes a gas contacting system similar to tower 2 in FIG. 1, but replaces the reboiler 11 with the HydroSonic pump mentioned above or a similar shock wave or cavitation pump as described in the above enumerated patents (sometimes described herein as a shock wave pump and/or a cavitation regenerator).

Figure 1:
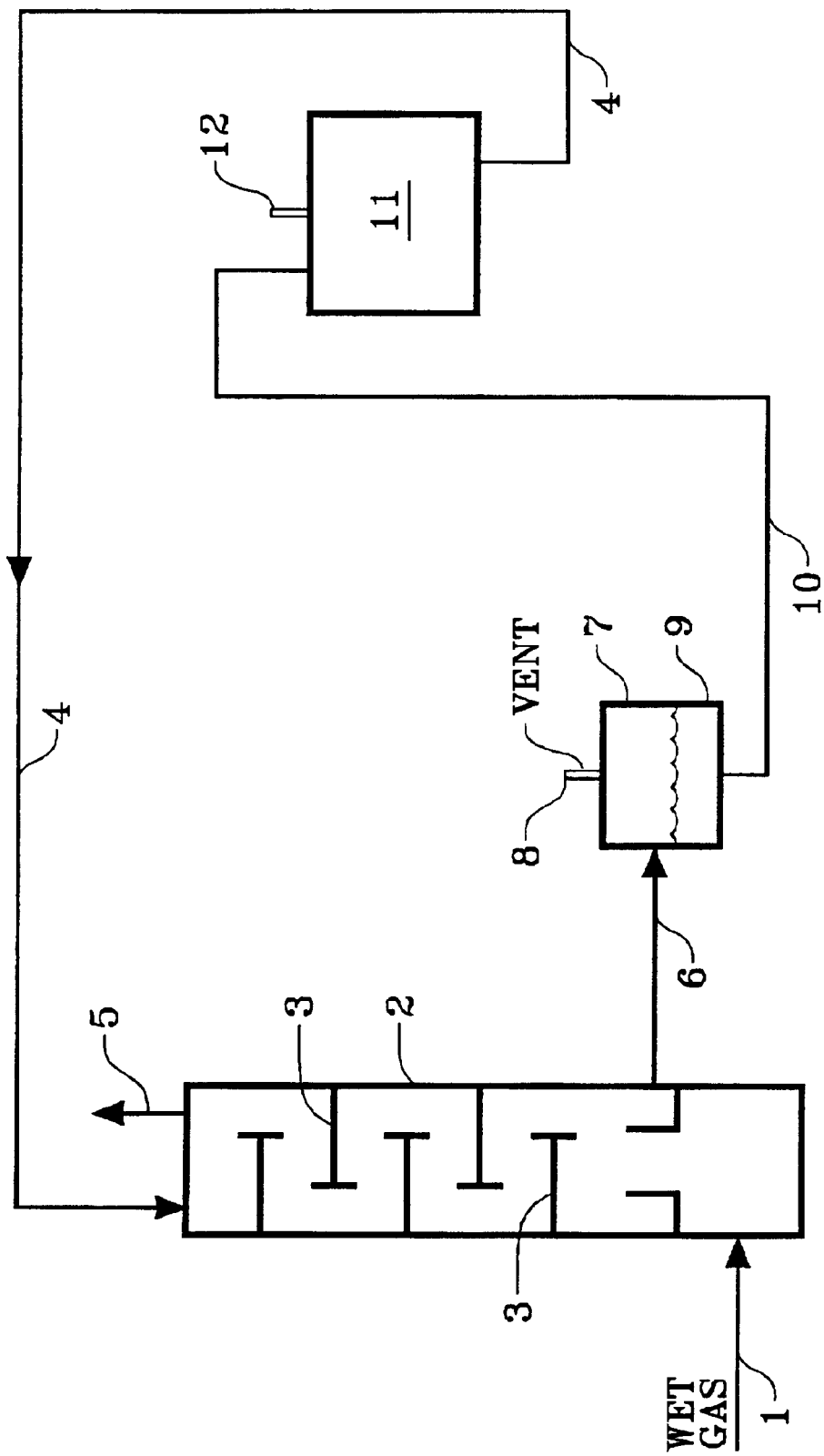
FIG. 1 is a simplified diagram of a prior art glycol gas dehydration system in which the glycol is regenerated conventionally in a reboiler.

Referring now to the prior art process of FIG. 1, "wet" natural gas continuously or intermittently enters tower 2 through line 1 and ascends through bubble plates 3 to the top and exits tower 2 in line 5 as dry gas, usually to be further transported but of course it may be used for any conventional or nonconventional purpose for natural gas, particularly where dryness is desirable. In the prior art process, a conventional glycol is introduced continuously or intermittently into the tower 2 through line 4. The glycol or glycol solution is permitted to trickle through the bubble plates 3 in tower 2, where it picks up moisture from the natural gas by contacting it as the gas rises in the tower 2. The glycol solution thus becomes diluted with the water it picks up from the natural gas; this diluted glycol solution is sent through line 6 usually to a flash drum 7 which may permit water vapor or steam to escape through vent 8. The dilute glycol solution 9 is then sent through line 10 to a conventional reboiler 11 where it is heated to evaporate water vented through line 12. Glycol solution restored to a desired concentration is returned through line 4 to the tower 1 where the process is repeated.

As indicated above, my invention includes a process as described with respect to FIG. 1 in which a cavitation regenerator is substituted for reboiler 11. The cavitation regeneration will concentrate—that is, regenerate—a glycol solution as well as a potassium formate solution.

Figure 2A:
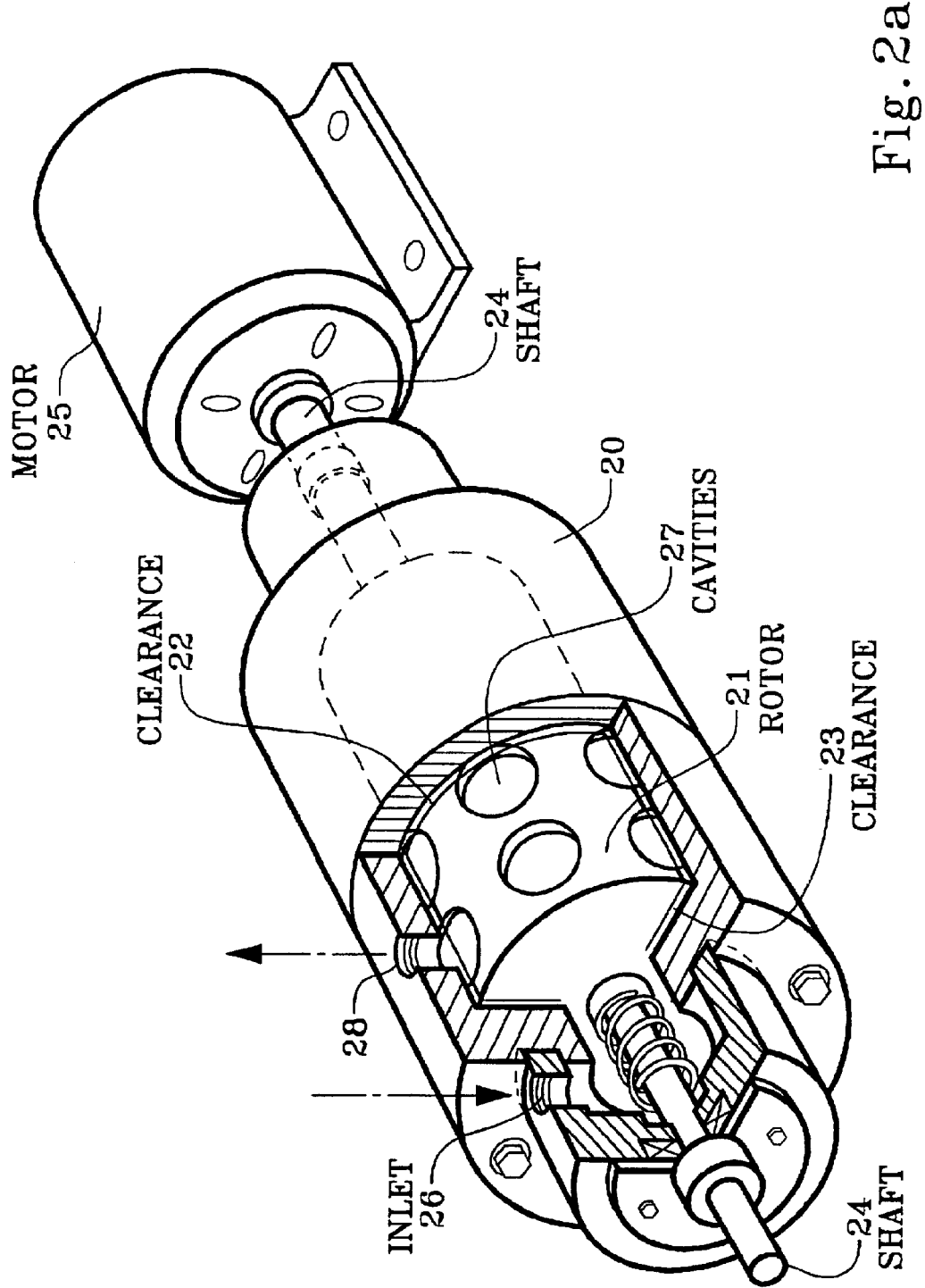
FIGS. 2A and 2B show variations of a cavitation pump as utilized in my invention.
Figure 2B:
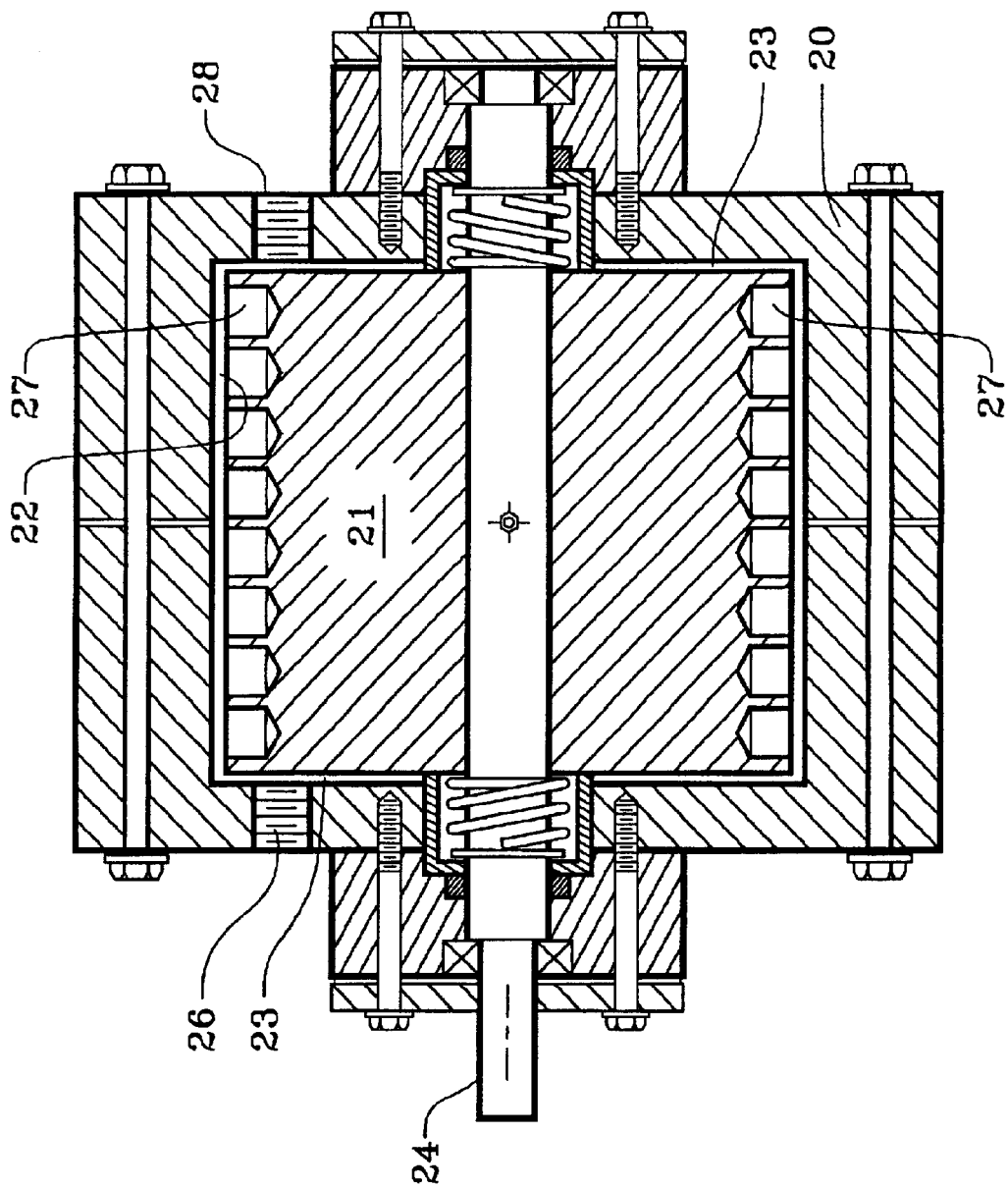

FIGS. 2A and 2B show two slightly different variations of a device, sometimes known as a cavitation pump, or a cavitation regenerator, preferred for use in my invention to regenerate the potassium formate solution I use to absorb moisture from natural gas and other gases. FIGS. 2A and 2B are taken from FIGS. 1 and 2 of Griggs U.S. Pat. No. 5,188,090, which is incorporated herein by reference along with related U.S. Patents U.S. Pat. Nos. 5,183,513, 5,184,576, 5,239,948, 5,385,298, 5,957,122. As explained in the U.S. Pat. No. 5,188,090 patent and elsewhere in the referenced patents, liquid is heated in the device without the use of a heat transfer surface.

A housing 20 in FIGS. 2A and 2B encloses cylindrical rotor 21 leaving only a small clearance 22 around its curved surface and clearance 23 at the ends. The rotor 21 is mounted on a shaft 24 turned by motor 25. Cavities 27 are drilled or otherwise cut into the surface of rotor 21. As explained in the Griggs patents, other irregularities, such as shallow lips around the cavities 27, may be placed on the surface of the rotor 21. Some of the cavities 27 may be drilled at an angle other than perpendicular to the surface of rotor 21—for example, at a 15 degree angle. Liquid—in the case of the present invention, potassium formate solution—is introduced through port 26 under pressure and enters clearances 23 and 22. As the solution passes from port 26 to clearance 23 to clearance 22 and out exit 28, areas of vacuum are generated and heat is generated within the liquid from its own turbulence, expansion and compression (shock waves). As explained at column 2 lines 61 et seq in the U.S. Pat. No. 5,188,090 patent, "(T)he depth, diameter and orientation of (the cavities) may be adjusted in dimension to optimize efficiency and effectiveness of (the cavitation pump) for heating various fluids, and to optimize operation, efficiency, and effectiveness . . . with respect to particular fluid temperatures, pressures and flow rates, as they relate to rotational speed of (the rotor 21)." Smaller or larger clearances may be provided (col. 3, lines 9-14). Also the interior surface of the housing 20 may be smooth with no irregularities or may be serrated, feature holes or bores or other irregularities as desired to increase efficiency and effectiveness for particular fluids, flow rates and rotational speeds of the rotor 21. (col. 3, lines 23–29) Rotational velocity may be on the order of 5000 rpm (col 4 line 13). The diameter of the exhaust ports 28 may be varied also depending on the fluid treated. Pressure at entrance port 26 may be 75 psi, for example, and the temperature at exit port 28 may be 300° F. Thus the potassium formate solution may be flashed or otherwise treated to remove the excess water as steam or water vapor. Treatment should be calculated to return a potassium formate solution of the concentration desirable for another cycle of water absorption from the natural gas in a gas dryer (contactor) or tower such as tower 2 in FIG. 1. Preferably, concentration of the potassium formate at inlet port 26 is from 40% to 80%, more preferably from 45–70%. Generally, regeneration is most advantageous after the solution has absorbed at least 10% (based on the original solution) water from the gas, preferably 35% or more, but in practice the process is preferably more or less continuous and so the concentration to be regenerated may vary from time to time. The cavitation pump of FIGS. 2A and 2B takes the place of the reboiler 11 of FIG. 1 for regeneration of the potassium formate solution used in my invention; line 12 of FIG. 1, representing a flash vent, may be attached to port 28. After regeneration, the solution is preferably in the same range as it was originally.

Operation of the cavitation regenerator is as follows. A shearing stress is created in the solution as it passes into the narrow clearance 22 between the rotor 21 and the housing 20. This shearing stress causes an increase in temperature. The solution quickly encounters the cavities 27 in the rotor 21, and tends to fill the cavities, but the centrifugal force of the rotation tends to throw the liquid back out of the cavity, which creates a vacuum. The vacuum in the cavities 27 draws liquid back into them, and accordingly "shock waves" are formed as the cavities are constantly filled, emptied and filled again. Small bubbles, some of them microscopic, are formed and imploded. All of this stress on the liquid generates heat which increases the temperature of the liquid dramatically. The design of the above-described cavitation pump ensures that, since the bubble collapse and most of the other stress takes place in the cavities, little or no erosion of the working surfaces of the rotor 21 takes place, and virtually all of the heat generated remains within the liquid.

Figure 3:
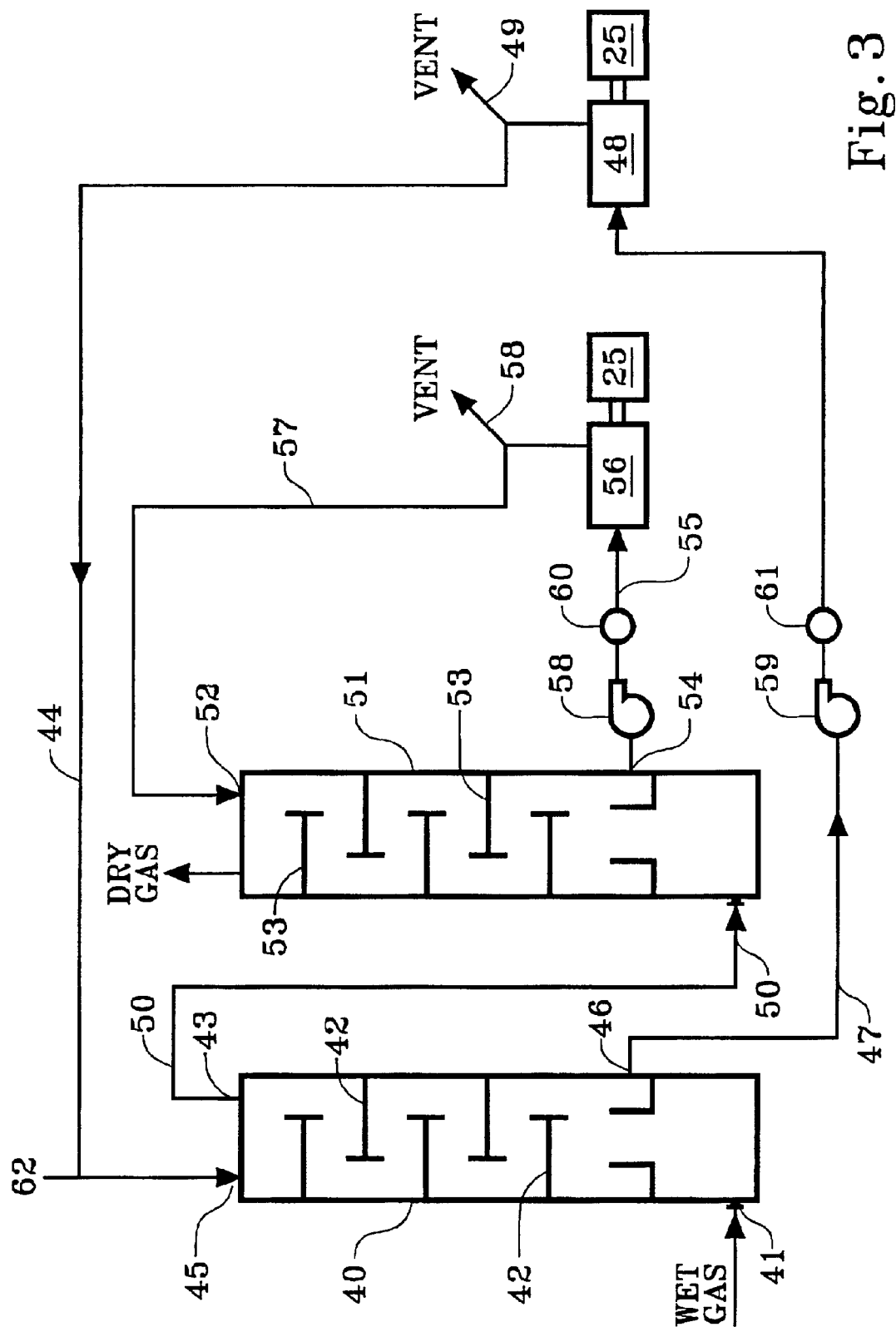
FIG. 3 illustrates the use of two cavitation pumps similar to FIGS. 2A and 2B used in a two-stage gas drying system of my invention.

Temperatures within the cavitation pump—of the rotor 21, the housing 20, and the potassium formate solution within the clearance spaces 22 between the rotor and the housing—remain substantially constant after the process is begun and while the feed rate and other variables are maintained at the desired values. There is no outside heat source; it is the mechanical energy of the spinning rotor that is converted to heat taken up by the solution and soon removed along with the solution when it passes through exit 28 (FIGS. 2A or 2B), or lines 57 or 44 (FIG. 3). The rotor and housing indeed tend to be lower in temperature than the liquid in clearances 22 and 23. There is little danger of scale formation even with high concentrations of potassium formate in the solution being processed.

Definition: As used herein, the term "cavitation regenerator" includes the above described cavitation pump, sometimes referred to as a shock wave pump. It includes the Hydrosonic Pump™ made by Hydro Dynamics, Inc. of 8 Redmont Court, Rome, Ga. It includes all of the devices capable of heating liquids between two shearing surfaces described in the six patents incorporated by reference above; preferably shearing surfaces include a rotor having cavities or other irregularities. And, the term "cavitation regenerator" includes any device or method capable of heating a potassium formate solution by mechanical shearing, shock waves or cavitation rather than by an external source of heat to be passed through a heat exchange surface. Such devices and methods include the use of turbulence generated between two close surfaces, at least one of which is moving, as explained above.

Thus my invention includes a method of drying natural gas comprising contacting the natural gas with an aqueous solution of potassium formate to absorb moisture therefrom, and regenerating the potassium formate solution in a cavitation regenerator.

FIG. 3 shows a variation of my invention in which two stages are used for drying the gas. Here, wet natural gas enters tower 40 through port 41 and proceeds upwards through bubble plates 42 as in FIG. 1, to an exit 43. Countercurrently, a potassium formate solution, preferably at 40–65% concentration, from source 62 enters through entrance 45 and trickles through bubble plates 42, where it picks up moisture from the gas. The somewhat diluted potassium formate solution leaves tower 40 at exit 46 through line 47 and is taken to cavitation pump 48 where it is regenerated as explained with respect to FIGS. 2A and 2B, returning through line 44 after releasing excess water through vent 49. The gas thus treated in tower 40 exits through exit 43 and is taken through line 50 to the lower regions of tower 51 which is similar to tower 40 but has a potassium formate solution preferably of higher concentration entering through entrance port 52. As with the other towers described herein, the solution proceeds through bubble plates 53 to a point near the bottom of tower 51, where it is removed at exit 54 through line 55 and taken to cavitation pump 56, operating in the manner described with respect to FIGS. 2A and 2B. As indicated previously, the regenerated solution, in line 57, is preferably maintained at 55–80% potassium formate. The desired concentration of potassium formate may be maintained by adjustment of the vent 58, the clearances 22 and 23, the configuration and disposition of cavities 27, the pressure of the solution at the entrance to the cavitation pump, and the rotational speed of the rotor 21 as powered by motor 25. Pumps 58 and 59 and pressure regulators 60 and 61 may be used on lines 47 and 55 to assure the desired pressure at the entrances to cavitation pumps 48 and 56.

Persons skilled in the art will appreciate that the two-stage gas drying system of my invention may result in a very dry gas, preferably having only 2 to 7 pounds of moisture per 1000 cubic feet.

Also it should be evident that other configurations and combinations may result in a very dry gas. For example, in FIG. 4, a flow sheet is shown for a system having two dehydration towers A and B and one cavitation regenerator 70 powered by motor 71. In this system, wet gas enters tower A through line 73 and proceeds upwards through the tower, which is similar to tower 2 in FIG. 1. As in tower 2, a solution of potassium formate is delivered from line 74 through the top and permitted to percolate or otherwise contact the countercurrently moving gas, picking up moisture from the gas as the gas and solution contact. The now considerably dryer gas is passed through line 75 to tower B, where it also passes upwardly through a solution of potassium formate, this one being preferably more concentrated than the solution in line 75. The more concentrated solution is delivered to the top of tower B through line 76, which comes from an exit port not shown (similar to exit port 28 of FIG. 2a or 2b) in cavitation regenerator 70. The relatively dilute solution of potassium formate created in tower B by the water absorbing action of the potassium formate solution delivered to the top of tower B by line 76 is moved through line 77 from tower B to flash vessel 78. In flash vessel 78, a simple release of pressure permits the flashing of steam and water vapor through vent line 79, thus producing a more concentrated, regenerated solution of potassium formate quite capable of absorbing moisture from the gas in tower A. Water is also flashed or otherwise released from cavitation pump 70 through line 80 (see also vent 58 in FIG. 3). It should be understood that whenever I speak of flashing or venting excess water, one may use other methods for separating water at temperatures above its boiling point, such as condensing. Generally, the solution in line 76 will be more concentrated than the solution in line 74. A typical distribution of concentrations might be that solution in line 74 is 40–65% potassium formate and the solution in line 76 is 55–80% potassium formate. I do not intend to be bound by these specifics, however, and the particular concentration values will, of course, depend on many variables such as the types and capacities of the flash vessel 78, towers A and B, and cavitation regenerator 70 as well as the amount of moisture in the gas and its flow rate. Other configurations may be used—for example, the first dilute KCOOH solution from tower A may be passed through a flash vessel to concentrate it instead of cavitation regenerator 70, and the second dilute KCOOH solution from tower B may be concentrated in a cavitation regenerator instead of flash vessel 78.

The data in Table 1 below show a comparison of the water absorption ability of 70% potassium formate with 100% triethylene glycol (TEG) and tripropylene glycol (TPG), both of which are commonly used in gas dehydration.

TABLE 1

| | Percent Water Absorbed, by Weight | | | | |
|---|---|---|---|---|---|
| | Orig. Wt., g | 24 hours | 48 hours | 72 hours | 96 hours |
| KCOOH | 20.27 | 50 | 71 | 87 | — |
| 70% | 43.44 | 16 | 28 | Void | — |
| | 63.22 | 13 | 22 | 31 | — |
| | 23.13 | 43 | 60 | 76 | 88 |
| | 35.88 | 25 | 32 | 59 | 61 |
| | 43.65 | 22 | 33 | 49 | 56 |
| | 23.41 | 46 | 61 | 77 | — |
| | 12.92 | 69 | 87 | 97 | — |
| | 31.45 | 33 | 52 | 66 | — |
| | 46.27 | 33 | 47 | — | — |

TABLE 1-continued

| | Percent Water Absorbed, by Weight | | | | |
|---|---|---|---|---|---|
| | Orig. Wt., g | 24 hours | 48 hours | 72 hours | 96 hours |
| TEP | 21.06 | 36 | 46 | 56 | — |
| 100% | 37.44 | 19 | 26 | 32 | — |
| | 44.37 | 17 | 23 | 30 | — |
| | 17.45 | 27 | 43 | 51 | 58 |
| | 18.43 | 40 | 51 | 61 | 71 |
| | 27.22 | 20 | 31 | 38 | 47 |
| TPG | 19.80 | 20 | 28 | 32 | — |
| 100% | 45.67 | 14 | 20 | 25 | — |
| | 56.85 | 12 | 17 | 21 | — |

For collecting the above data, samples were weighed and placed in a desiccator. The humidity was recorded and the weight gained over the indicated time periods was also recorded.

Thus it will be seen that my invention includes of a method of drying gas comprising contacting the gas with an aqueous solution of potassium formate to absorb moisture therefrom, and regenerating the solution in a cavitation regenerator. The gas may be air, natural gas, or any other gas containing moisture which may be absorbed by a potassium formate solution.

My invention also includes a method of drying natural gas comprising contacting the natural gas with a first solution comprising at least 40% weight percent potassium formate to absorb moisture therefrom, contacting the natural gas with a second solution of at least 55% weight percent potassium formate to absorb moisture therefrom, regenerating the first solution in a cavitation regenerator, and regenerating the second solution in a cavitation regenerator.

In another aspect, my invention includes a method of concentrating a water absorbent solution comprising passing the solution through a cavitation regenerator to remove at least 10% of the water therein.

In yet another aspect, my invention includes a method of drying gas comprising (a) contacting the gas in a first gas contactor with a solution comprising potassium formate to absorb water from the gas into said solution and form a semi-dry gas and a first dilute solution comprising potassium formate, (b) concentrating the first dilute solution comprising potassium formate to form a first regenerated potassium formate solution, (c) contacting the semi-dry gas from the first gas contactor with the first regenerated potassium formate solution to form a dry gas and a second dilute solution comprising potassium formate, (d) concentrating the second dilute solution comprising potassium formate to form a second regenerated solution comprising potassium formate, and (e) passing the second regenerated potassium formate solution to the first gas contactor.

What is claimed is:

1. Method of drying gas comprising contacting said gas with an aqueous solution of potassium formate to absorb moisture therefrom, and regenerating said solution in a cavitation regenerator.

2. Method of claim 1 wherein said solution contains from 40% to 80% potassium formate both initially and after said regenerating, and wherein said solution, after regenerating, is used again to dry gas.

3. Method of claim 2 wherein said solution contains from 70% to 75% potassium formate.

4. Method of claim 1 wherein said regenerating step is conducted after said solution has absorbed water to an extent of at least 35% by weight based on the original solution.

5. Method of claim 1 wherein said gas is natural gas.

6. Method of claim 5 wherein said natural gas is contacted with said aqueous solution of potassium formate in an absorption tower.

7. Method of claim 1 wherein said gas is air.

8. Method of drying natural gas comprising contacting said natural gas with a first solution comprising at least 40% weight percent potassium formate to absorb moisture therefrom, contacting said natural gas with a second solution of at least 55% weight percent potassium formate to absorb moisture therefrom, regenerating said first solution in a cavitation regenerator, and regenerating said second solution in a cavitation regenerator.

9. Method of claim 8 wherein said second solution contacts said natural gas after it has been contacted with said first solution.

10. Method of claim 9 including returning the regenerated first solution to contact said natural gas.

11. Method of claim 10 including returning the regenerated second solution to contact said natural gas after it has contacted said regenerated first solution.

12. Method of claim 8 wherein said first solution comprises 40–65% potassium formate by weight.

13. Method of claim 8 wherein said second solution comprises 55–80% potassium formate by weight.

14. Method of concentrating a water absorbent solution which has been diluted by absorbing water from a gas comprising passing said solution through a cavitation regenerator to remove at least 10% of the water therein.

15. Method of claim 14 wherein said water absorbent solution comprises a glycol.

16. Method of claim 14 wherein said water absorbent solution comprises potassium formate.

17. Method of drying gas comprising (a) contacting said gas in a first gas contactor with a solution comprising potassium formate to absorb water from said gas into said solution and form a semi-dry gas and a first dilute solution comprising potassium formate, (b) concentrating said first dilute solution comprising potassium formate to form a first regenerated potassium formate solution, (c) contacting said semi-dry gas from said first gas contactor with said first regenerated potassium formate solution to form a dry gas and a second dilute solution comprising potassium formate, (d) concentrating said second dilute solution comprising potassium formate to form a second regenerated solution comprising potassium formate, and (e) passing said second regenerated potassium formate solution to said first gas contactor.

18. Method of claim 17 which is continuous and wherein said gas is natural gas.

19. Method of claim 17 wherein at least one of steps (b) and (d) is performed in a cavitation regenerator.

20. Method of claim 17 wherein at least one of steps (a) and (c) is performed in an absorption tower.

\* \* \* \* \*